(12) United States Patent
Chefalas et al.

(10) Patent No.: US 10,540,706 B2
(45) Date of Patent: Jan. 21, 2020

(54) SYSTEM FOR INTELLIGENT INJECTING AND EJECTING OF VIRTUAL CONNECTED BUTTONS FOR OS INTERFACES

(71) Applicant: INTERNATIONAL BUSINESS MACHINES CORPORATION, Armonk, NY (US)

(72) Inventors: Thomas E. Chefalas, Somers, NY (US); Clifford A. Pickover, Yorktown Heights, NY (US); Maja Vukovic, New York, NY (US); Komminist Sisai Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 662 days.

(21) Appl. No.: 15/244,240

(22) Filed: Aug. 23, 2016

(65) Prior Publication Data

US 2018/0060944 A1    Mar. 1, 2018

(51) Int. Cl.
*G06Q 30/06*  (2012.01)
*G06Q 50/00*  (2012.01)
*G06Q 30/02*  (2012.01)

(52) U.S. Cl.
CPC ......... *G06Q 30/0641* (2013.01); *G06Q 50/01* (2013.01)

(58) Field of Classification Search
None
See application file for complete search history.

(56) References Cited

U.S. PATENT DOCUMENTS

| 2004/0153347 | A1 | 8/2004 | Kunze et al. |
| 2005/0288953 | A1* | 12/2005 | Zheng ............... G06Q 30/02 705/1.1 |
| 2005/0289050 | A1 | 12/2005 | Narayanan et al. |
| 2006/0129463 | A1 | 6/2006 | Zicherman |
| 2012/0197734 | A1 | 8/2012 | DeLuca |
| 2016/0026253 | A1* | 1/2016 | Bradski ............... G02B 27/225 345/8 |

* cited by examiner

*Primary Examiner* — Garcia Ade
(74) *Attorney, Agent, or Firm* — F. Chau & Associates, LLC

(57) ABSTRACT

A system for injecting and ejecting virtual connected buttons on an operating system (OS) interface includes one or more communications channels connecting a host to on-line product/service acquisition sites, information on a user's purchases from the acquisition sites, a virtual purchasing connected button (VPCB) for each product/service the user buys from an acquisition site that can be displayed on an interface of the OS of the host, and an online-purchasing system manager that triggers, based on that information, a deferring action of the display of the VPCB on the OS interface for one or more products.

26 Claims, 6 Drawing Sheets

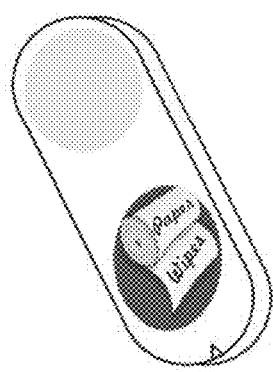
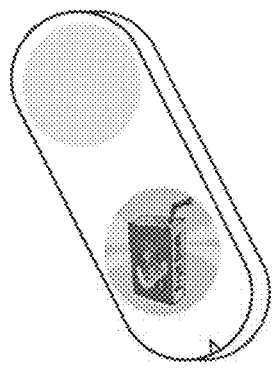
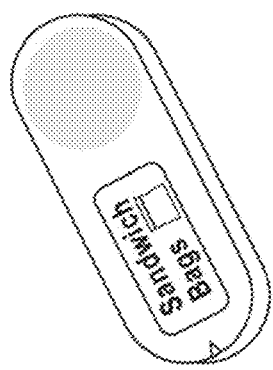
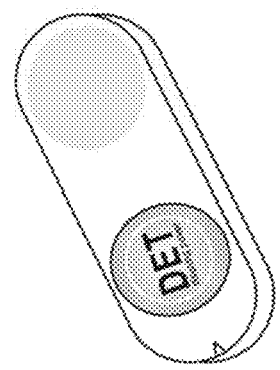
FIG. 1
FIG. 2

SYSTEM FOR INTELLIGENT INJECTING AND EJECTING OF VIRTUAL CONNECTED BUTTONS FOR OS INTERFACES

BACKGROUND

Technical Field

Embodiments of the present disclosure are directed to methods and systems for managing virtual connected buttons for OS interfaces.

Discussion of the Related Art

A connected button is a small, physical, electronic device with an embedded button inscribed with the name of an often-ordered product that is designed to use either wireline or wireless communication to make ordering products easier and faster from an online vendor. A connected button can operate according to any communication protocol, including wireless protocols such as Wi-Fi, data bundles, P2P via Bluetooth, etc. An exemplary, non-limiting connected button is the Dash Button introduced by Amazon.com in 2015 to be used with Amazon's and Dash Replenishment Service. Typically, users can configure a connected button to order a specific product and quantity, via a user's vendor account, and mount the buttons to locations where the products are used. Pressing the button sends a signal to a vendor shopping application, which automatically places an order for the product the button is configured to order. Amazon Dash Buttons are partnered with over 60 brands. FIG. 1 shows several examples of Amazon Dash Buttons.

An operating system (OS) taskbar is an element of a graphical user interface (GUI) which typically shows which programs or applications are running on the device, as well as providing links or shortcuts to other programs or places, such as a start menu, a notification area, and a clock. FIG. 2 depicts a taskbar for Microsoft Windows®. A taskbar is typically a long strip along one edge of the screen upon which are are various icons which correspond to open windows within a program, or programs or files pinned by users for easier access. A taskbar frequently has a notification area in which real-time information about the state of the computer system and programs running on it can be displayed. However, other regions of the OS GUI may also be used for posting notifications and icons, besides the taskbar.

SUMMARY

Exemplary embodiments of the present disclosure provide a method and system for an online-purchasing ecosystem manager for an OS graphical user interface, a communications channel from one or more product/service on-line acquisition sites, such as Amazon.com, Walmart, eBay, etc., information on a user's purchases from the acquisition sites, and, based on the information, trigger a deferring action of the display of a virtual purchasing connected button (VPCB) on the taskbar for one or more products.

According to an embodiment of the disclosure, there is provided a system for injecting and ejecting virtual connected buttons on an operating system (OS) interface that includes one or more communications channels connecting a host to on-line product/service acquisition sites, information on a user's purchases from the acquisition sites, a virtual purchasing connected button (VPCB) for each product/service the user buys from an acquisition site that can be displayed on an interface of the OS of the host, and an online-purchasing system manager that triggers, based on that information, a deferring action of the display of the VPCB on the OS interface for one or more products.

According to a further embodiment of the disclosure, the on-line acquisition sites include store sites, auction sites, and services sites.

According to a further embodiment of the disclosure, the information on a user's purchases includes a product, a date, a price, periodicity for the same or related purchases, purchases within a user's family or social network, speed of purchasing, According to a further embodiment of the disclosure, the deferring action is one of blocking the VPCB from appearing, deferring the VPCB from appearing for a predetermined period of time, and scheduling VPCB to appear with a predetermined periodicity.

According to a further embodiment of the disclosure, a VPCB is user configurable to order a specific product and quantity via a vendor's account, and to order a specific product and quantity before the product becomes out-of-stock.

According to a further embodiment of the disclosure, a VPCB is user configurable to be injected into a designated computer desktop region.

According to a further embodiment of the disclosure, a VPCB sends a signal to a vendor shopping app upon being selected by a user, and automatically orders a new stock of a product the VPCB is configured to order.

According to a further embodiment of the disclosure, a selected VPCB sends a message to a user's mobile phone and gives the user a predetermined period of time to cancel the order of new stock.

According to a further embodiment of the disclosure, a graphical appearance of a VPCB changes based on an aspect of a purchase, wherein the aspects include a reminder to purchase or that a purchase is in progress, or the availability of a discount or coupon.

According to a further embodiment of the disclosure, the OS interface in which the VPCB can be displayed includes a task bar.

According to a further embodiment of the disclosure, the system includes a predictive model that learns a user's buying habits and periodicities and determines a number of VPCBs to display in the OS interface, based on a cost/benefit analysis, a peak purchase demand, a frequency of when products/services were sold, a user's cognitive preferences, a size of a screen of a computing device being used.

According to a further embodiment of the disclosure, the online-purchasing system manager is configured to show a user a graphical representation in the OS interface of one or more products and receiving a user selection of at least one of the products for display as a VPCB in the OS interface.

According to a further embodiment of the disclosure, the online-purchasing system manager is configured to receive a signal from a physical product connected button and to display a VPWF in response to said signal.

According to another embodiment of the disclosure, there is provided a program storage device readable by a computer, tangibly embodying a program of instructions executed by the computer to implement a system for injecting and ejecting virtual connected buttons on an operating system (OS) interface.

BRIEF DESCRIPTION OF THE DRAWINGS

FIG. 1 shows several examples of connected buttons, according to embodiments of the disclosure.

FIG. 2 depicts a taskbar for Microsoft Windows®, according to embodiments of the disclosure.

DETAILED DESCRIPTION OF EXEMPLARY EMBODIMENTS

Figure 3:
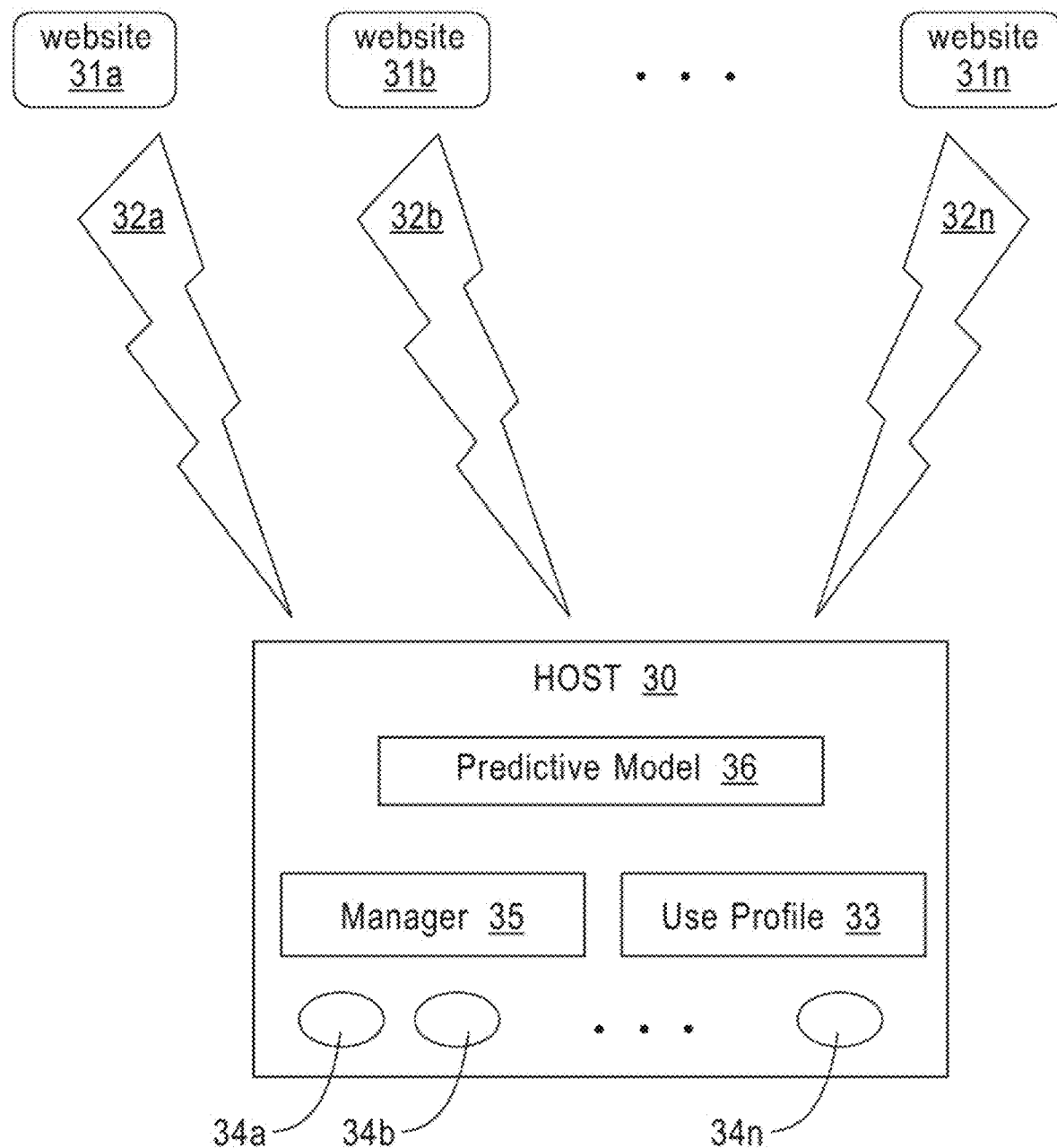
FIG. 3 is a schematic block diagram of a system for managing virtual purchasing connected buttons according to an embodiment of the disclosure.

Exemplary embodiments of the disclosure as described herein generally include systems for intelligent injecting and ejecting of virtual connected buttons for OS taskbars. Embodiments are described, and illustrated in the drawings, in terms of functional blocks, units or steps. Those skilled in the art will appreciate that these blocks, units or steps can be physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units or steps being implemented by microprocessors or similar, they may be programmed using software, such as microcode, to perform various functions discussed herein and may optionally be driven by firmware and/or software. Alternatively, each block, unit or step may be implemented by dedicated hardware, or as a combination of dedicated hardware to perform some functions and a processor, such as one or more programmed microprocessors and associated circuitry, to perform other functions. Also, each block, unit or step of the embodiments may be physically separated into two or more interacting and discrete blocks, units or steps without departing from the scope of the disclosure. Further, the blocks, units or steps of the embodiments may be physically combined into more complex blocks, units or steps without departing from the scope of the disclose. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

FIG. 3 is a schematic block diagram of a system for managing virtual purchasing connected buttons according to an embodiment of the disclosure that includes one or more communications channels 31a, 31b, . . . , 31n from a host 30 to on-line product/service acquisition sites 32a, 32b, . . . , 32n, such as Amazon.com, Walmart, eBay, etc., a user profile 33 that includes historic information on purchases from the acquisition sites and home/family and shopping purchasing patterns or preferences for the user, a virtual purchasing connected button 34a, 34b, . . . , 34n for each product/service the user buys from an acquisition site, and, an online-purchasing system manager 35 that performs priority and crawling management, including crawling product websites in real-time based on the user's profile and historic cohort, and that includes an icon for installation on the OS taskbar that can trigger, based on that information, a deferring action of the display of a virtual purchasing connected button (VPCB) on the taskbar for one or more products. For example, a user who has just bought an inkjet cartridge does not need to see a VPCB icon on the taskbar for x months. Note that although FIG. 3 shows the user information 33 and manager 35 as being part of the host 30, these components need not be installed or stored on the host, and can be accessible via the cloud, as will be described below.

Figure 4:
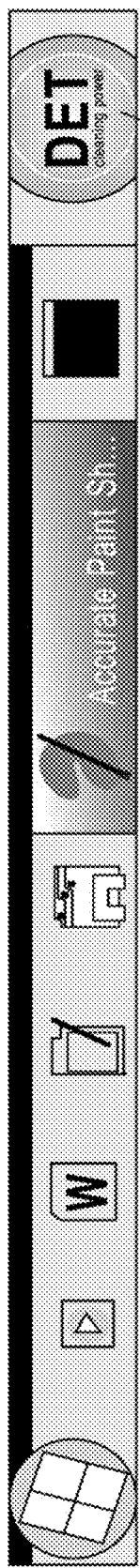
FIG. 4 shows a Microsoft Windows® taskbar with several added VPCBs according to an embodiment of the disclosure.

According to an embodiment of the disclosure, a virtual purchasing connected button (VPCB) is displayed on a taskbar in a manner similar to other items on a taskbar. It is selectable, for example, using a mouse cursor. FIG. 4 shows a Microsoft Windows® taskbar with several added VPCBs, such as a VPCB for Tide 41. The on-line acquisition sites may include store sites, auction sites, services sites, etc. The purchase information can include the nature of the purchase, the product, date, price, the periodicity for the same or related purchases, etc. The purchase information can also include purchases from a user's family or social network. A VPCB deferring action can be one of: blocking the VPCB from appearing, deferring a VPCB from appearing for a certain period of time, scheduling a VPCB to appear with a certain periodicity, etc. In the context of VPCB actions, injecting refers to the action of making a VPCB appear in an OS taskbar, and ejecting refers to the action of removing a VPCB from appearing in the OS taskbar.

According to embodiments, injection or removal of connected buttons on the taskbar can be based, in part, by tracking/learning about online shopping stores and detecting discounts, such as discounts on Tide® detergent at Walmart. In this case, the connected button may only appear on taskbar if a discount is above a predetermined threshold. According to further embodiments, users or third parties can use composable templates to help determine discount or price thresholds.

According to embodiments, a specialized or customized use of a VPCB is that it can be integrated with POS (Point of Sale) and inventory systems and can inject buttons into the taskbar that are related to those items that need to be in-stock before the shopkeeper is out-of-stock. This can help a shopkeeper or owner to place inventory ahead of time.

According to embodiments, a user's speed of purchasing is considered. A user's buying periodicities, either manual or automated, are considered and learned. Most aspects of this can be accomplished in an opt-in manner by a user, and a limit to the number of displayed VPCBs can be enforced. The user will want a system according to an embodiment to facilitate various types of ordering of products that he/she often buys. A system according to an embodiment may use predicative models, similarity analysis algorithms, etc., based on a user's purchasing history over a period of time to recommend new products for which a system according to an embodiment can inject a VPCB. Predictive models and prioritization functions, based on, for example, a cost/benefit analysis for the case of shop owner, determination of peak purchase demand, a frequency of when things were sold, or the availability of new products based on similarity or predictive models, can be used to determine the number of VPCBs to display, along with a consideration of user cognitive preferences, as a system according to an embodiment does not want to overwhelm the user and his/her taskbar, and thus a system according to an embodiment can choose to defer injection of VPCBs. This is useful for small screen devices, such as mobile devices, as well as for information consumability based on a user's profile. For example, based on a user's past history, the user may prefer to see a maximum of N VPCBs, as described below. FIG. 3 shows a predictive model 36 as part of the host 30, however, embodiments are not limited thereto, and in other embodiments, the predictive model need not be installed on the host, and can be accessible via the cloud, as will be described below.

According to embodiments, a user can configure a VPCB to order a specific product and quantity, via the vendor's account, and mount the VPCB to the taskbar, computer desktop region, etc. A drag-and-drop interface can be used, as desired. In some embodiments, the injection/rejection can be rotated based on a user's preference or on intelligent prioritization functions, such as correlating with other contextual data to determine unique insights, such as weather, traffic, ads for small stores, promotions, holiday seasons, etc.

According to embodiments, selecting a VPCB sends a signal to a vendor shopping app, such as an Amazon Shopping app, and automatically orders new stock of whatever product the button is configured to order. Selecting a VPCB, e.g., with a mouse cursor, can send a message to the user's mobile phone, and the user has a timed window, such as a half-hour, to cancel. In some cases, a user's order configuration or preferences may be outdated, and a system according to embodiments of the disclosure can detect such configurations and preferences, and send a notification to the user by ejecting the associated VPCB.

According to some embodiments, the graphical appearance of the VPCB changes based on an aspect of the purchase, which can include a reminder to purchase, a coloration that the purchase is in progress, etc. A system according to embodiments of the disclosure can learn in various ways about VPCB blocking and deferring for cohorts of users. For example, a system according to an embodiment can learn that it is advantageous to defer or block the appearance of VPCBs for certain products for certain periods of time for certain groups of users. A system according to embodiments of the disclosure can selectively block VPCBs from being displayed on a taskbar to a user based upon recent user purchases. The selectively blocked VPCBs can be chosen from a group of VPCBs chosen for the user based upon monitored or learned behavior of the user.

Further embodiments of the disclosure involve related aspects. For example, in some embodiments, information can be obtained about one or more items that are of interest to one or more users. For each item, the number of users that identify the item as an item of interest is determined. Negotiations can even be conducted with a seller of the item for a discounted price for a number of items at least equal to the number of users that identified the item as an item of interest. In further embodiments, a coupon is sent to the users that identify the item as an item of interest. The coupon permits the purchase of the item at the negotiated discounted price. A VPCB according to an embodiment can provide an indication of prices, coupons, etc. In some embodiments, the coupon can be virtually attached to a VPCB with a color code to indicate the validity of the coupon, such as green for an active coupon, yellow for a coupon about to expire, and red for an expired coupon.

According to embodiments, VPCBs appear before a reordering frequency/time period has expired, or if a special offer or a reduced price is available from one of the registered merchants. For example, if a user subscribes to a monthly Pampers delivery from Amazon, and suddenly Diapers.com has a better deal, a VLDB button according to an embodiment will appear the taskbar, giving the user an option to take the advantage of the Diapers.com deal. In such cases, the icon may be shaded/grayed out, or a notification may be displayed on top of the icon, thereby indicating to the user that there are special offers. Over time, a system according to an embodiment will learn that the user will buy extra diapers from Diapers.com regardless of the monthly subscribe and save option through Amazon.

A system according to an embodiment can utilize learning algorithms to capture and reason about a user's purchasing patterns and correspondingly adapt the VLDBs. For example, if a user suddenly starts buying Onesies infant bodysuits from Carter's in size 24M/2T, a system according to an embodiment will automatically update the user's VPCB for diapers from size 4 to 5. A system according to an embodiment can correlate purchases and item properties, and appropriately render VPCBs.

According to further embodiments, a client application monitors web pages and vendor product pages visited by a consumer and determines whether the visited web page or vendor product/services page is actually product oriented and, if so, then contacts a product server to automatically retrieve and display, via a VPCB according to an embodiment, corresponding product purchasing information, if available in a product centric database. However, if the web page is not found in a database, it and its product information can be added thereto. A product centric database according to an embodiment is created by a product-information-gathering web crawler and a second web product-price-crawler using the harvested product information to find prices corresponding to the product on unvisited web pages. The updating of a product centric database according to an embodiment can be performed in an opt-in manner by a user, and a limit to the number of displayed VPCBs can be enforced.

According to further embodiments, a VPCB can be used in conjunction with software packages to monitor data entered into a travel reservation booking software. Upon detection of a predetermined data entry sequence, the software package can launch a routine to display appropriate VPCBs according to embodiments. The triggered display of VPCBs can be performed in an opt-in manner by a user, and a limit to the number of displayed VPCBs can be enforced. As above, the injection/rejection of a VPCB according to an embodiment can be orchestrated based on user preference or intelligent prioritization functions.

A system according to further embodiments can be extended to food delivery systems, such as pizza delivery systems, in which a system according to an embodiment uses speech recognition techniques to track meal orders. In addition, based on user cohort characteristics, such as health, etc., a system according to an embodiment can eject/inject icons, provide meal planning advise, etc. Thus, a system according to an embodiment can provide a health feature that can block some connected buttons if foods are inappropriate, due to, for example, kosher laws, calories, vegan needs, diabetic needs, celiac-disease needs, etc. A VPCB according to an embodiment can be spawned if the VPCB maps to particularly healthy items. Further embodiments of the disclosure can provide a diet template for VPCB injection and ejection.

Figure 5:
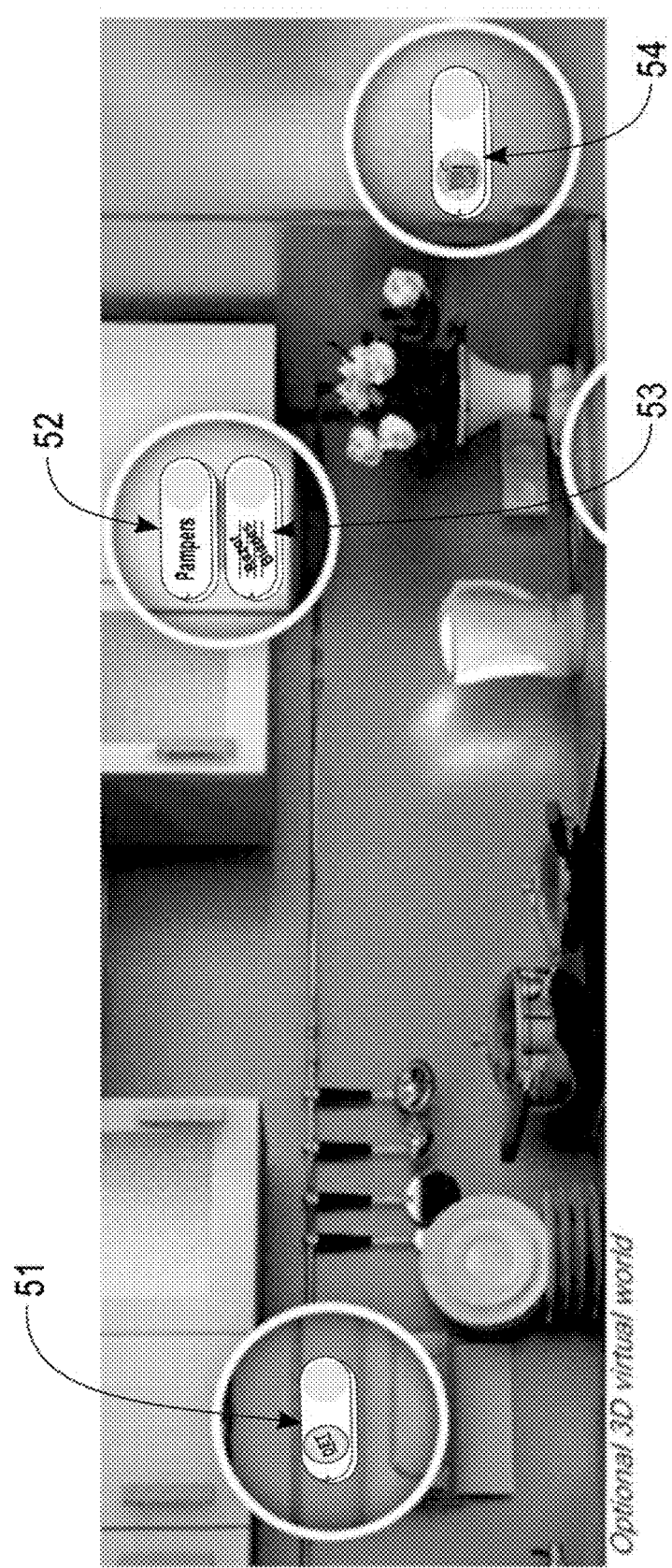
FIG. 5 depicts an optional 3D virtual world, according to an embodiment.
Figure 6:
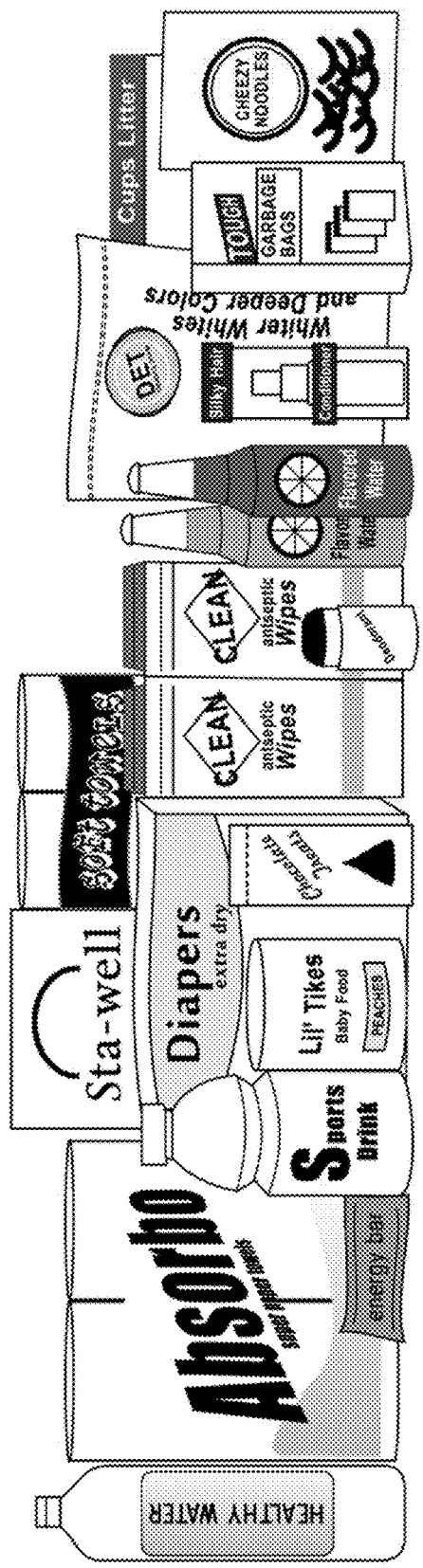
FIG. 6 depicts a graphic for selecting VPCBs, according to an embodiment.

According to further embodiments of the disclosure, a taskbar display can be extended to VPCBs on other GUI elements of the desktop of computer screens, tablets, smartphones, TVs, virtual worlds, Roku and Chromecast displays, or displays of related digital media player set-top boxes, etc. Still further embodiments of the disclosure can present VR representations, such as 3D immersive representations, with virtual connected buttons. FIG. 5 depicts an optional 3D virtual world, according to an embodiment, with virtual connected buttons 51, 52, 53, and 54. Note that even on a standard 2D computer desktop, a user can actually use drag and drop to bring connected buttons to a taskbar. However, a system according to an embodiment can, based on having learned which products a user has previously purchased or have been used by users in a social network, or a product placement completed by a vendor, present to a user a graphic as shown in FIG. 6 for consideration for VPCB taskbar injection. For example, a user may drag one of the product representations in the figure to the taskbar.

Figure 7:
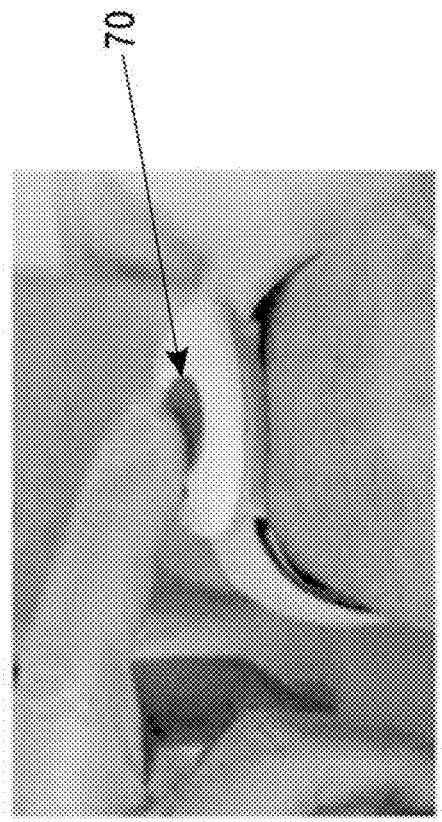
FIG. 7 shows a user selecting an actual connected buttons to be viewed as a VPCB according to an embodiment.

According to further embodiments, a user, while in a real store, may indicate a desire for a product to be added to the VPCB on a taskbar. According to an embodiment, as shown in FIG. 7, a user can select an actual (physical) connected button 70 to be additionally viewed as a VPCB, which provides the physical buttons with additional versatility.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
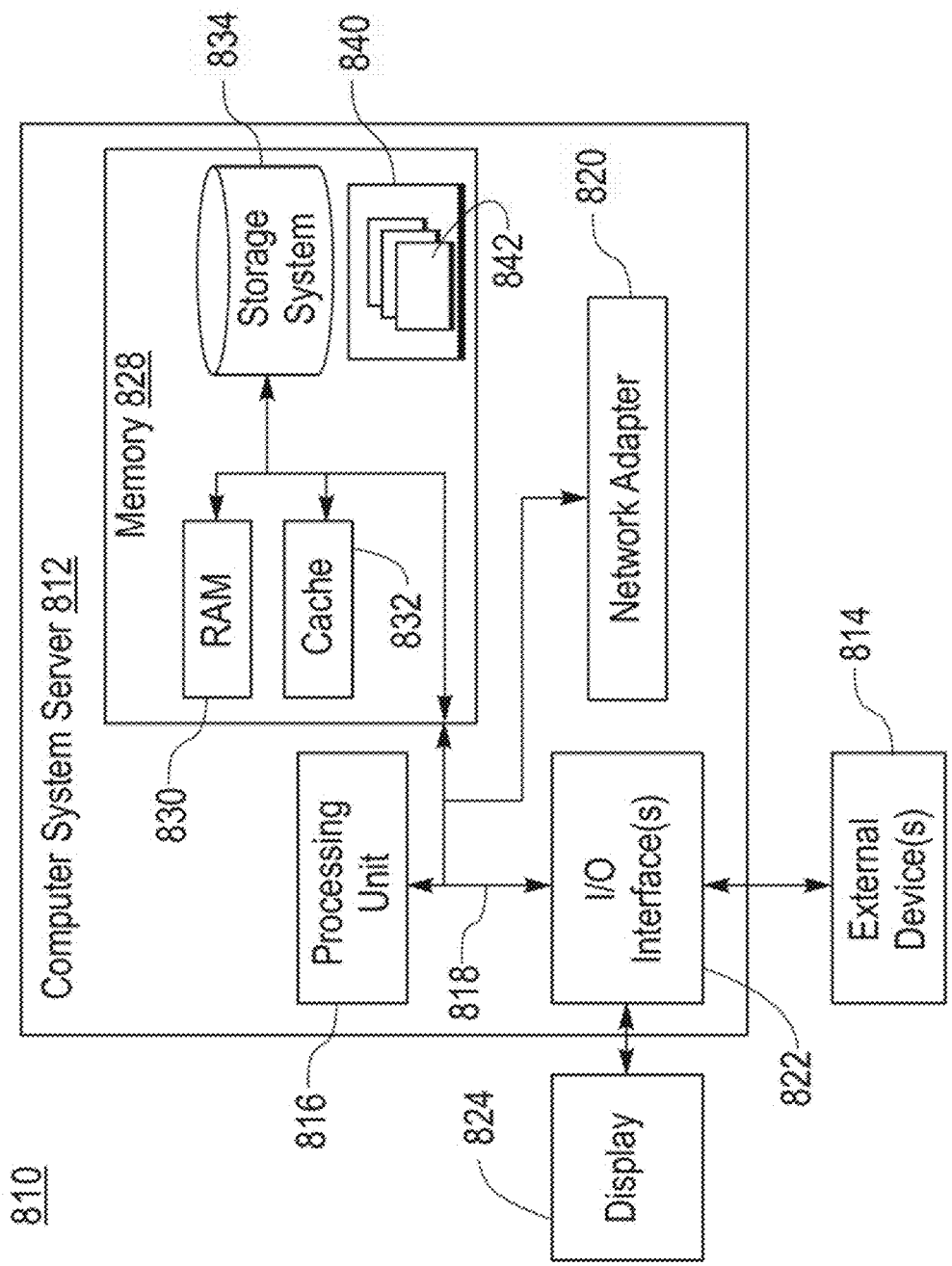
FIG. 8 is a schematic of an exemplary cloud computing node that implements an embodiment of the disclosure.

Referring now to FIG. 8, a schematic of an example of a cloud computing node is shown. Cloud computing node 810 is only one example of a suitable cloud computing node and is not intended to suggest any limitation as to the scope of use or functionality of embodiments of the disclosure described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the disclosure as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network the (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
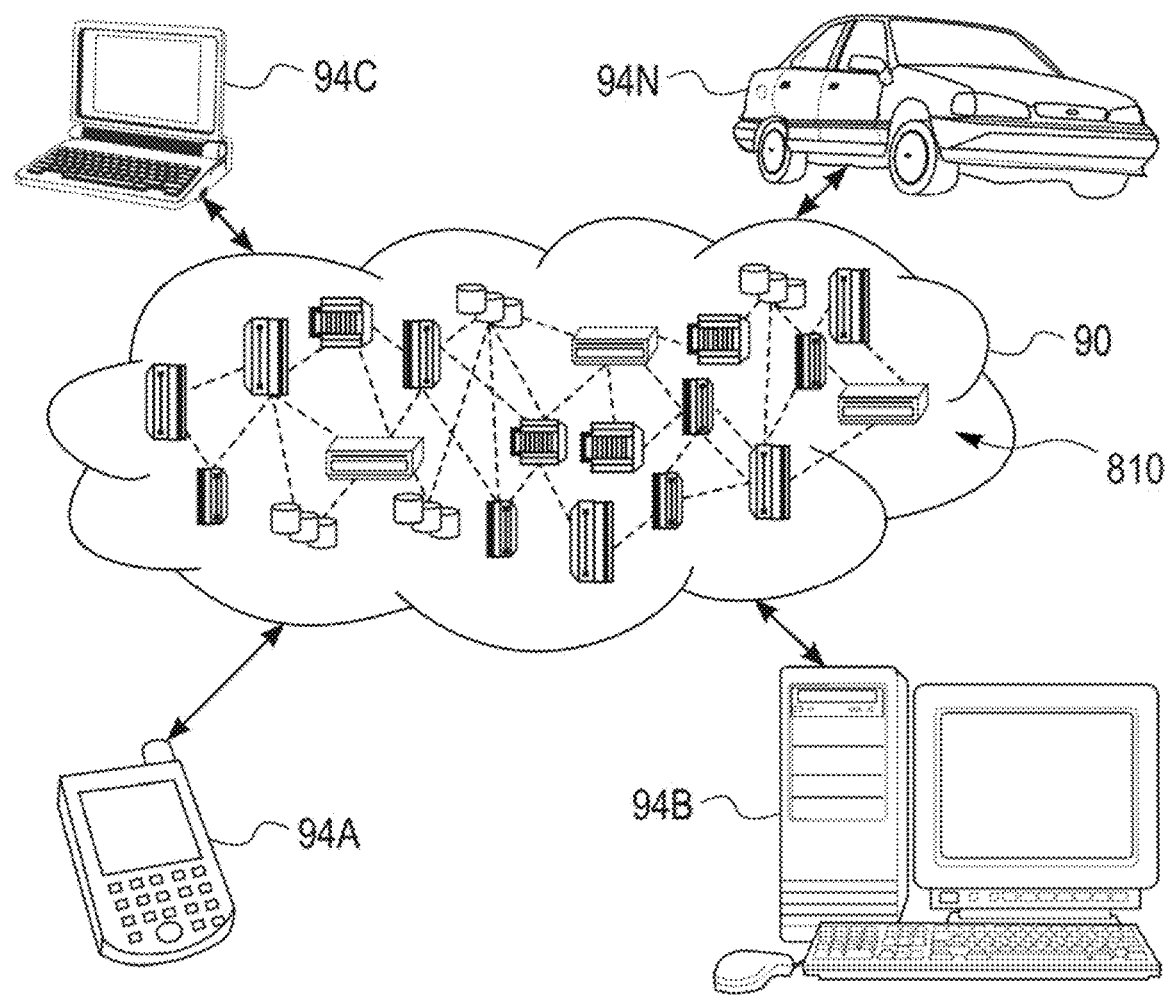
FIG. 9 shows an exemplary cloud computing environment according to embodiments of the disclosure.

Referring now to FIG. 9, illustrative cloud computing environment 90 is depicted. As shown, cloud computing environment 110 comprises one or more cloud computing nodes 810 with which local computing devices used by cloud consumers, such as, for example, personal digital assistant (PDA) or cellular telephone 94A, desktop computer 94B, laptop computer 94C, and/or automobile computer system 94N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 90 to offer infrastructure, platforms and/or software as services for which a cloud consumer does not need to maintain resources on a local computing device. It is understood that the types of computing devices 94A-N shown in FIG. 9 are intended to be illustrative only and that computing nodes 810 and cloud computing environment 90 can communicate with any type of computerized device over any type of network and/or network addressable connection (e.g., using a web browser).

While embodiments of the present disclosure has been described in detail with reference to exemplary embodiments, those skilled in the art will appreciate: that various modifications and substitutions can be made thereto without departing from the spirit and scope of the disclosure as set forth in the appended claims.

What is claimed is:

1. A system for injecting and ejecting virtual connected buttons on an operating system (OS) interface, comprising:
   one or more communications channels connecting a host to on-line product/service acquisition sites;
   information on a user's purchases from the acquisition sites;
   a virtual purchasing connected button (VPCB) for each product/service the user buys from an acquisition site that can be displayed on an interface of the OS of the host, wherein the VPCB is user configurable upon being physically touched by a user to order a specific product and quantity via a vendor's account; and
   an online-purchasing system manager that triggers, based on that information, a deferring action of the display of the VPCB on the OS interface for one or more products.

2. The system of claim 1, wherein the on-line acquisition sites include store sites, auction sites, and services sites.

3. The system of claim 1 wherein the information on a user's purchases includes a product, a date, a price, periodicity for the same or related purchases, purchases within a user's family or social network, speed of purchasing.

4. The system of claim 1, wherein the deferring action is one of blocking the VPCB from appearing, deferring the VPCB from appearing for a predetermined period of time, and scheduling VPCB to appear with a predetermined periodicity.

5. The system of claim 1, wherein a VPCB is user configurable upon being physically touched by a user to order a specific product and quantity before the product becomes out-of-stock.

6. The system of claim 1, wherein a VPCB is user configurable to be injected into a designated computer desktop region.

7. The system of claim 1, wherein a VPCB sends a signal to a vendor shopping app upon being selected by a user, and automatically orders a new stock of a product the VPCB is configured to order.

8. The system of claim 7, wherein a selected VPCB sends a message to a user's mobile phone and gives the user a predetermined period of time to cancel the order of new stock.

9. The system of claim 1, wherein a graphical appearance of a VPCB changes based on an aspect of a purchase, wherein the aspects include a reminder to purchase or that a purchase is in progress, or the availability of a discount or coupon.

10. The system of claim 1, wherein the OS interface in which the VPCB can be displayed includes a task bar.

11. The system of claim 1, further comprising a predictive model that learns a user's buying habits and periodicities and determines a number of VPCBs to display in the OS interface, based on a cost/benefit analysis, a peak purchase demand, a frequency of when products/services were sold, a user's cognitive preferences, a size of a screen of a computing device being used.

12. The system of claim 1, wherein the online-purchasing system manager is configured to show a user a graphical representation in the OS interface of one or more products and receiving a user selection of at least one of the products for display as a VPCB in the OS interface.

13. The system of claim 1, wherein the online-purchasing system manager is configured to receive a signal from a physical product connected button and to display a VPWF in response to said signal.

14. A program storage device readable by a computer, tangibly embodying a program of instructions executed by the computer to implement a system for injecting and ejecting virtual connected buttons on an operating system (OS) interface, the system comprising:
   one or more communications channels connecting a host to on-line product/service acquisition sites;
   information on a user's purchases from the acquisition sites;
   a virtual purchasing connected button (VPCB) for each product/service the user buys from an acquisition site that can be displayed on an interface of the OS of the host, wherein the VPCB is user configurable upon being physically touch by a user to order a specific product and quantity via a vendor's account; and
   an online-purchasing system manager that triggers, based on that information, a deferring action of the display of the VPCB on the OS interface for one or more products.

15. The computer readable program storage device of claim 14, wherein the on-line acquisition sites include store sites, auction sites, and services sites.

16. The computer readable program storage device of claim 14 wherein the information on a user's purchases includes a product, a date, a price, periodicity for the same or related purchases, purchases within a user's family or social network, speed of purchasing.

17. The computer readable program storage device of claim 14, wherein the deferring action is one of blocking the VPCB from appearing, deferring the VPCB from appearing for a predetermined period of time, and scheduling VPCB to appear with a predetermined periodicity.

18. The computer readable program storage device of claim 14, wherein a VPCB is user configurable upon being physically touched by a user to order a specific product and quantity before the product becomes out-of-stock.

19. The computer readable program storage device of claim 14, wherein a VPCB is user configurable to be injected into a designated computer desktop region.

20. The computer readable program storage device of claim 14, wherein a VPCB sends a signal to a vendor shopping app upon being selected by a user, and automatically orders a new stock of a product the VPCB is configured to order.

21. The computer readable program storage device of claim 20, wherein a selected VPCB sends a message to a user's mobile phone and gives the user a predetermined period of time to cancel the order of new stock.

22. The computer readable program storage device of claim 14, wherein a graphical appearance of a VPCB changes based on an aspect of a purchase, wherein the aspects include a reminder to purchase or that a purchase is in progress, or the availability of a discount or coupon.

23. The computer readable program storage device of claim 14, wherein the OS interface in which the VPCB can be displayed includes a task bar.

24. The computer readable program storage device of claim 14, wherein the system further comprises a predictive model that learns a user's buying habits and periodicities and determines a number of VPCBs to display in the OS interface, based on a cost/benefit analysis, a peak purchase demand, a frequency of when products/services were sold, a user's cognitive preferences, a size of a screen of a computing device being used.

25. The computer readable program storage device of claim 14, wherein the online-purchasing system manager is configured to show a user a graphical representation in the OS interface of one or more products and receiving a user selection of at least one of the products for display as a VPCB in the OS interface.

26. The computer readable program storage device of claim 14, wherein the online-purchasing system manager is configured to receive a signal from a physical product connected button and to display a VPWF in response to said signal.

* * * * *